June 10, 1958 W. SPRICK 2,838,602

CHARACTER READER

Filed July 22, 1953 7 Sheets-Sheet 1

INVENTOR.
WALTER SPRICK

BY

Dewey J. Cunningham
ATTORNEY

June 10, 1958 W. SPRICK 2,838,602

CHARACTER READER

Filed July 22, 1953 7 Sheets-Sheet 2

INVENTOR.
WALTER SPRICK

BY

Dewey J. Cunningham

ATTORNEY

June 10, 1958 W. SPRICK 2,838,602

CHARACTER READER

Filed July 22, 1953 7 Sheets-Sheet 3

INVENTOR.
WALTER SPRICK

BY

Dewey J. Cunningham
ATTORNEY

June 10, 1958 W. SPRICK 2,838,602

CHARACTER READER

Filed July 22, 1953 7 Sheets-Sheet 4

INVENTOR.
WALTER SPRICK

BY

Dewey J. Cunningham
ATTORNEY

June 10, 1958 W. SPRICK 2,838,602

CHARACTER READER

Filed July 22, 1953 7 Sheets-Sheet 5

INVENTOR.
WALTER SPRICK

BY Dewey J Cunningham
ATTORNEY

CHARACTER READER

Filed July 22, 1953 7 Sheets-Sheet 6

INVENTOR.
WALTER SPRICK

BY Dewey J. Cunningham

ATTORNEY

INVENTOR.
WALTER SPRICK
BY
Dewey J. Cunningham
ATTORNEY

United States Patent Office 2,838,602 Patented June 10, 1958

2,838,602

CHARACTER READER

Walter Sprick, Boeblingen, Germany, assignor to International Business Machines Corporation, New York, N. Y., a corporation of New York Application July 22, 1953, Serial No. 369,671

Claims priority, application Germany July 26, 1952

14 Claims. (Cl. 178—15)

The present invention relates to devices for identifying line traces and more particularly relates to an apparatus for reading printed and handwritten characters.

An object of the present invention is to furnish an improved analyzing device for identifying line traces.

Another object of the invention is to provide an improved analyzing device for scanning a line trace and supplying a voltage output characteristic thereof.

A further object is to provide an improved means for scanning printed or handwritten characters and supplying an output signal characteristic of the outline thereof.

A still further object of this invention is to furnish an improved means for centering the scanning pattern of a character in the approximate center thereof.

Another object of the invention is to provide an improved means for preliminarily scanning a character which is off-center in a scanning field and locating the scanning beam in the approximate center of the character for a second scanning operation.

Another object of the invention is to furnish, in a character analyzing device, improved means for providing dark control of a scanning beam in all areas of the scanning field except in an area immediately surrounding the character being scanned.

Another object of the invention is to provide, in a character analyzing device, improved means for determining the general inclination of the character.

Another object of the invention is to provide improved means for scanning a character and providing an output signal which varies in accordance with the angular relationship between the inclination of the character and a predetermined reference line.

Another object of the invention is to provide a character analyzing device in which a scanning beam radiates outwardly across the outline of the character from the approximate center thereof a number of times, each succeeding scan of the beam being angularly displaced from the preceding scan, the operation being divided into a predetermined number of zones so that characteristic pulses for predetermined characters are provided in certain zones.

Another object is to provide an improved character analyzing apparatus, as described in the object immediately above, in which the beginning of a zone is controlled by the inclination of the character.

Another object of the invention is to furnish an improved analyzing device for scanning printed or handwritten indicia, obtaining output signals characteristic of said indicia during different periods of the scanning operation, storing said output signals, and reading the stored signals to provide an output signal indicative of the indicia scanned.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference numerals represent similar parts throughout the several views.

Figure 1:
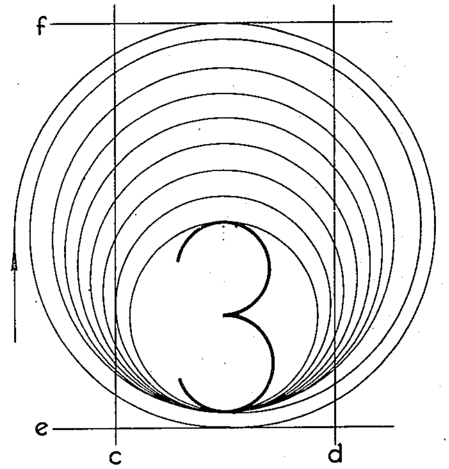
Fig. 1 shows diagrammatically the manner in which the digit "3," chosen by way of example, is scanned during the prescanning operation.

In practicing my invention a scanning station is furnished. As a character is presented to the scanning station, generator means are provided to cause a scanning means to follow a decreasing spiral path in a field which includes said character. When the scanning means senses the top or bottom portions of the character a signal is furnished to a control means for said generator means to displace the effective center of said spiral path toward the center of the character. This process is continued until the effective center of the spiral path is at the effective center of the character. Means are furnished to be responsive to the interception of both the top and bottom portions of the character for causing the generator means to discontinue the spiral scanning and begin generating a plurality of successive angular displaced radial sweeps from the effective center of the character. During the latter scanning operation signals are produced when the scanning means senses portions of the character. Each of these signals is fed to superimposer means which provides an output signal for each input signal having a magnitude which is a function of the distance from the character center to the portion which produced the input signal. The signals from the superimposer means are integrated to provide a waveform which approximates the outline of the character scanned. This waveform is differentiated and the output occurring during predetermined time intervals is fed to a storage device. The storage devices are arranged to control the condition of a diode logical matrix so that a circuit exists through the matrix to a device which produces an output signal indicative of the identity of the character scanned. During the initial scanning operation for positioning the focal point of the decreasing spiral scanning pattern at the effective center of the character, a circuit is provided which is responsive to the time during a sweep when the top and bottom portions of the character are sensed for providing a signal for controlling the reference for the first radial sweep. During the second scanning operation an arrangement is provided for rendering the scanning means ineffective during portions of the radial scans which would tend to go outside the general field in which the character is located.

The reading of characters which includes those written by hand presents special problems. The practice of using masks to match with the character is not possible due to the difference in size of different individuals' handwriting. Also, a character does not always appear in the same position in a defined area in which the character is to be placed.

In the present invention the scanning of a character is divided into two operations, a prescanning portion and a main scanning portion. The word "character" as used herein refers to the generally accepted form or shape of some arbitrary or conventional device that is used in writing and in printing. The word "symbol" as used herein has the same meaning as the word "character." During the prescanning operation an electron beam is caused to follow a spiral of ever-decreasing configuration, the spiral being located symmetrically in a scanning field. The character to be scanned appears at some position in the field. It may be out of position vertically, i. e., above or below the focal point of the spiral. The scanning of each symbol begins with the largest possible scanning field or with the largest possible scanning ellipse, each being so large that no point of the symbol may be touched. The objective of scanning is now positively reduced, i. e., the scanning beam is passed spirally from the outside toward the inside. Upon the occurrence of an image pulse, i. e., upon contact with the upper or lower edge of a symbol the object of scanning is displaced upward or downward and is further reduced until image pulses appear at top and bottom. This is followed by opposite displacement voltages which do not change when the enveloping figure has assumed the smallest possible diameter. These voltages are stored for the main scanning operation and fix the pole in the symbol field. The main scanning operation now begins relative to the pole which has been established, said scanning beginning, for example, when the beam is to the left horizontally before the pole.

Fig. 1 shows the prescanning spiral which scans the digit "3," selected by way of example, and decreases steadily until a pulse appears when the beam senses the upper or lower portion of the symbol. That is, if the beam senses the lower portion of the figure the pole is deflected downwardly. The next time an image pulse is obtained whenever the scanning beam senses the lower portion of a symbol, the beam is deflected downwardly again. This process continues until image pulses appear on the upper edge also. The same process just described is identical but in reverse when the scanning beam senses the upper portion of the image first. The displacement voltages which are obtained during this period of the scanning process are stored in condensers. Let us call this process circular scanning. It is followed by scanning processes similar to that shown in Fig. 2 which may be termed star grid scanning. As the scanning beam senses portions of the symbol to be scanned image pulses are obtained which may be analyzed and recognized for feeding to evaluation devices.

Figure 2:
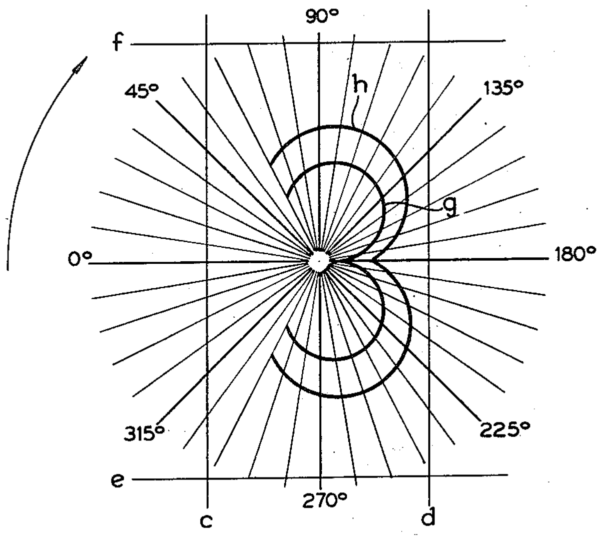
Fig. 2 shows diagrammatically the manner in which the digit "3," shown in two sizes at (*a*) and (*b*), is scanned during the main scanning operation.
Figure 3:
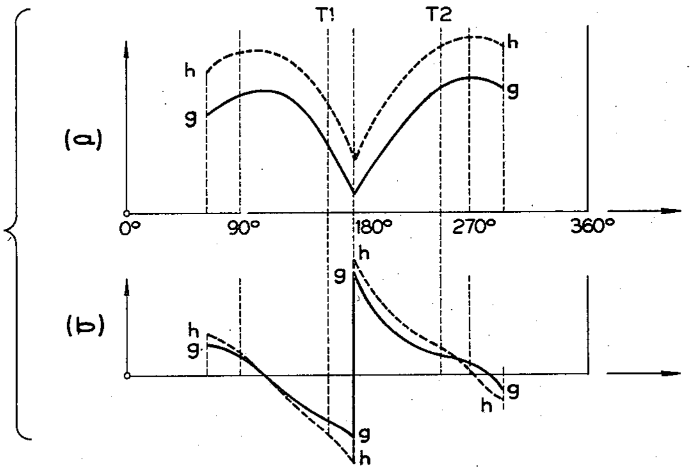
Fig. 3 shows the potential envelopes at (*a*) and (*b*) obtained by scanning the digits at (*a*) and (*b*) of Fig. 2.

Fig. 2 shows the digit "3" in two different sizes at $g$ and $h$. Both symbols, when scanned, produce the curves shown in Fig. 3 at $(a)$ in chronological dependence. The lower curve $g$ corresponds to the voltage curve of the small "3," and the upper curve $h$ corresponds to the voltage curve of the large "3." Fig. 3, at $(b)$, shows the derivative of curves $g$ and $h$ which for both curves produce practically the same course.

Figure 4:
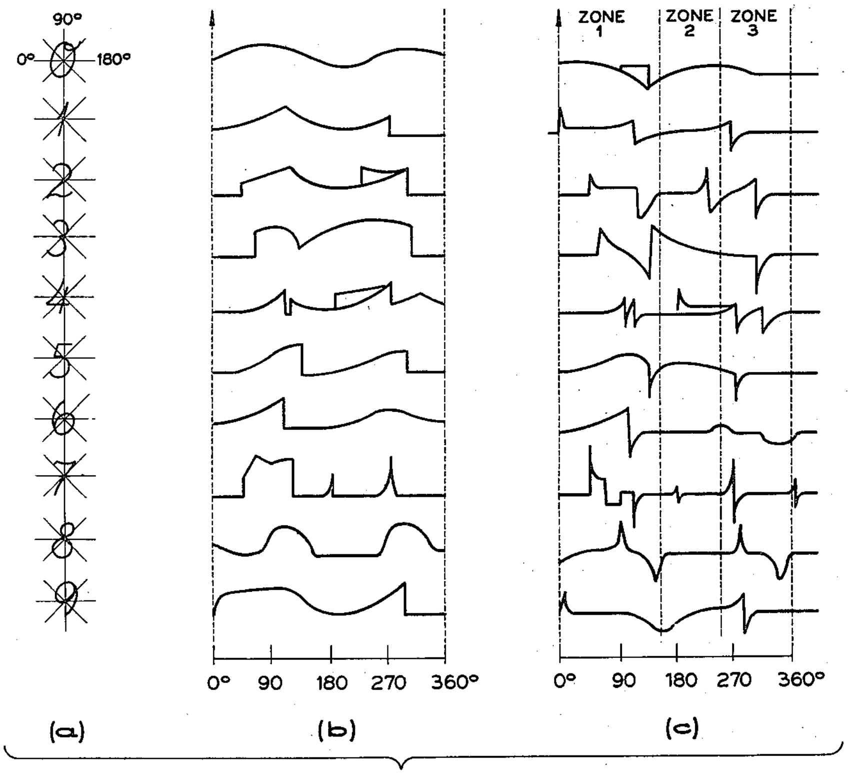
Fig. 4 shows at (*a*) the digits 0–9, at (*b*) the potentials obtained during the main scanning operation, and at (*c*) the derivative of the potentials shown at (*b*)

In order to prevent the spiral and star grid voltages from also scanning adjoining symbols the beam may be dark-controlled upon passing over the lines $c$, $d$, $e$ and $f$, according to Figs. 1 and 2. This can be brought about in such a manner that the horizontal deflection voltage, by way of example, upon obtaining a certain positive (line $c$) and negative (line $d$) voltage with respect to the anode of the iconoscope, causes the darkening of the scanning beam as long as this condition exists. In addition, the vertical deflection voltages can, upon exceeding a certain positive or negative voltage, cause dark-control in such manner that the scanning beam will now be sensitive only in one rectangular outlet. Fig. 4, at $(a)$, shows the digits 0–9; at $(b)$, the appearance of the scanning voltages for the digits; and at $(c)$ the derivative curves formed from the potentials at $(b)$. For the scanning of the upper and lower course of these symbols the same direction of motion has been selected. According to Fig. 4, at $(c)$ three zones are provided, of which the first zone comprises about 20°–150°, the second zone about 150°–250°, and a third zone about 250°–20°.

It will be seen that in certain zones characteristic pulses are found. Sometimes a single pulse occurs and in other instances one pulse is followed immediately by a second pulse, making a double pulse. By supplying these characteristic pulses to a pulse discriminator to distinguish between a single pulse and a double pulse, signals may be obtained which are used to identify the character being scanned.

Figure 6:
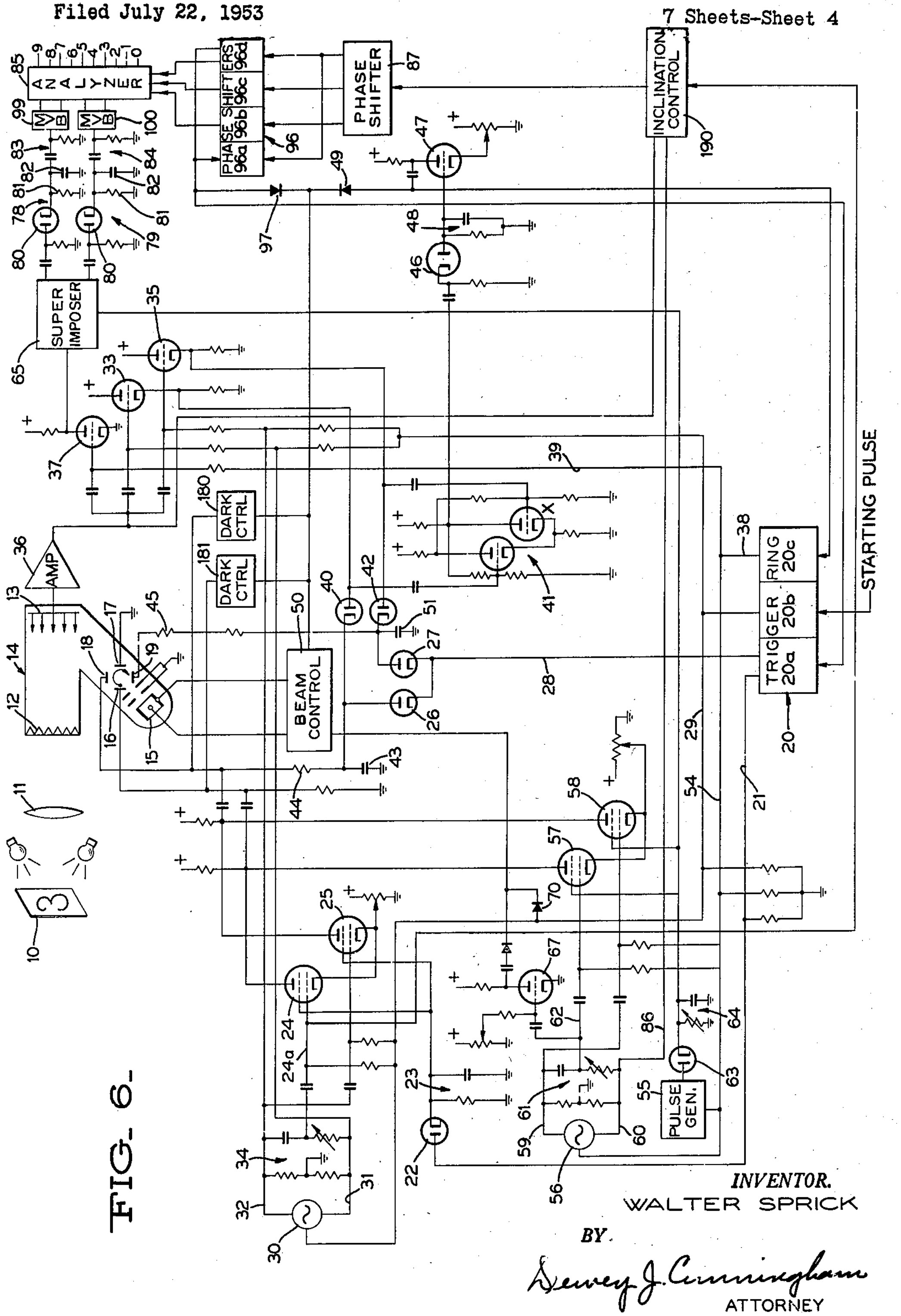
Fig. 6 shows a schematic diagram of the present invention, some of the circuits being shown in block form.

Referring to Fig. 6, the character which is to be scanned may be placed on a card 10 and illuminated by an appropriate light source. The image of the character is applied through lens 11 to the photocathode 12 and signal plate 13 of iconoscope 14. A beam of electrons is emitted from the cathode 15 of the iconoscope and is caused to scan the character image under the influence of the horizontal deflection plates 16 and 17 and the vertical deflection plates 18 and 19.

A trigger ring 20, including stages 20$a$, 20$b$ and 20$c$, is furnished to control the scanning operation. This trigger ring is shown in detail in Fig. 13 and will be explained more completely as the description proceeds. For the moment it is sufficient to state that each trigger is of the bi-stable flip-flop type, the connections therebetween being such that only one of the triggers can be "on" at one time. When the next stage is turned "on" the preceding stage turns "off." Starting with the condition when trigger 20$a$ is "on," one of the output potentials therefrom will be relatively high, this potential being applied through line 21 to the plate of a diode 22. The diode has an RC network 23 connected across the cathode thereof. This cathode potential is applied to the screen grids of tetrodes 24 and 25. The other output from trigger 20$a$ is relatively low and is applied to the cathode of diodes 26 and 27 to assure that capacitors 43 and 51, respectively, are discharged at this time.

When a character is in position to be scanned, a starting pulse is applied to trigger 20$b$, turing it "on." When this occurs, trigger 20$a$ turns "off," dropping the potential applied to diode 22. Due to the RC network 23, the potential on the screen grids of tubes 24 and 25 decreases in accordance with the time constant of the network. As soon as trigger 20$b$ is turned "on" the prescanning operation begins. At this time a relatively high potential is applied from trigger 20$a$ to the cathodes of diodes 26 and 27. The initiation of scanning is accomplished by supplying the relatively high potential from trigger 20$b$ over a line 29 to the control grids of tetrodes 24 and 25 and to a sine wave generator 30. A positive potential is applied through rectifier 70 to beam control trigger 50 to turn the beam on. The output from generator 30 is in the form of two sine waves which are 180° apart in phase. For simplicity in understanding, the sine wave on line 31 will be referred to as the voltage beginning at 0° and that on line 32 as the voltage beginning at 180°. The potential on line 32 is applied to the control grid of a triode 35 and across an RC phase shifting network 34 to the control grid of tetrode 24. The time constant of network 34 is such that the phase of voltage applied thereto is changed to begin at 270°. The voltage on line 32 is also applied to the control grid of tetrode 25. The voltage on line 31 is applied to the control grid of triode 33.

It will be seen that the output potentials from the plates of tetrodes 24 and 25 will be in the form of sine waves displaced in phase by 90° and continuously decreasing in magnitude. When the sine waves are applied to deflection plates 16 and 18, respectively, the scanning beam will make a spiral path which begins with a large spiral and decreases gradually. The rate of decrease is controlled by the time constant of RC network 23.

As explained previously, the scanning beam goes in its spiral path until either the top or bottom portion of the digit is intercepted. Taking Fig. 1 as an example, the scanning beam intercepts the bottom portion of the digit first. When this occurs, a pulse is supplied from the iconoscope signal plate to amplifier 36, the output of which is capacitively coupled to the control grids of triodes 37, 33 and 35. Triode 37 is cut off at this time due to the application of a relatively low voltage to the control grid thereof from trigger 20c, this voltage being applied through lines 38 and 39. It will be remembered that the voltages applied to the control grids of triodes 33 and 35 from sine wave generator 30 are displaced in phase by 180°. The arrangement is such that during the time the beam is nearest the top portion of the character, tube 33 is allowed to conduct, and during the time the beam is nearest the bottom portion of the character, tube 35 is allowed to conduct. However, neither of tubes 33 and 35 can conduct unless an image pulse is received.

Triodes 33 and 35 are connected as cathode followers so that when the grid potential rises to cause the tubes to conduct, the cathode potential rises. The cathode potential of triode 33 is applied to the plate of a diode 40 and to the control grid of the left side of a bi-stable flip-flop trigger 41. The grid potentials of this trigger are such that the trigger will be flipped from one side to the other by positive pulses only. The symbol X is used to denote the side of the trigger which is conducting during the "off" condition. The cathode potential of triode 35 is applied to the plate of a diode 42 and to the control grid of the right side of trigger 41.

Referring again to Fig. 1, the scanning beam intercepts the bottom portion of the character first so that only tube 35 conducts at this time. This causes tube 42 to conduct which starts charging capacitor 51. At the same time the potential is applied through a resistor 45 to the vertical deflection plate 19. This has the effect of dropping the focal point of the spiral scan so that the scanning beam, on its next sweep adjacent the top portion of the character, is closer to said top portion than it would have been had the bottom portion of the character not been intercepted. The displacement of the focal point is such that the scanning beam, on the next sweep adjacent the bottom of the character, will intercept said bottom portion and cause a second displacement of the focal point of the scanning beam in the same direction as the first. This process continues until the scanning beam intercepts the upper portion of the digit. This causes tubes 33 and 40 to conduct, charging capacitor 43. The same potential which charges capacitor 43 is applied through resistor 44 to the vertical deflection plate 18. This, of course, causes the focal point to be deflected upwardly. Once both the top and bottom portions of the character are intercepted, the focal point is moved alternately up and down each time the top and bottom of the character, respectively, is intercepted.

When the bottom portion of the character was first intercepted, a positive pulse was applied to the right side of trigger 41 keeping it turned "off." Further positive pulses obtained when the bottom of the digit was intercepted caused no change in the trigger. As soon as the top portion was intercepted a positive pulse was applied to the left side of the trigger turning it "on." The succeeding pulses, obtained when the beam intercepts the top and bottom portions of the character, causes the trigger to flip back and forth from one condition to the other. The plate of the right side of the trigger is coupled to the cathode of a diode 46, the anode of which is connected to the control grid of a normally conducting triode 47. An RC network 48 is connected across the plate of the diode so that the fluctuations in potential on the plate of the right side of the trigger causes the capacitor in the network to gradually charge. The rate of charge is dependent on the time constant of the network, this being such that the capacitor will only charge, and retain the charge, when the pulses obtained at the top and bottom of the character succeed each other rapidly. When the charge on the capacitor reaches a predetermined negative value, triode 47 cuts off, raising the plate potential thereof.

The plate of triode 47 is capacitively coupled directly to trigger 20c and through a rectifier 49 to a trigger 50. The details of trigger 50 are not shown. It is sufficient to say that it is of the bi-stable flip-flop type and is arranged so that the application of a positive pulse to one side thereof will flip the trigger and turn the scanning beam off. When a positive pulse is applied to the other side of the trigger, the trigger flips and turns the beam on again. The grid potential of tube 47 drops so as to cut the tube off, raising the plate potential. As this occurs a positive pulse is fed through rectifier 49 to trigger 50, cutting off the beam. The positive pulse also goes to trigger 20c, turning the trigger "on." A negative pulse, caused by a drop in potential on the plate of tube 47, cannot get through rectifier 49 and has no effect in stage 20c of trigger ring 20, since ring 20 is shifted by positive pulses only.

At this time trigger 20b is turned "off," sending a relatively low voltage to the control grids of tubes 24, 25, 33 and 35, so as to prevent further conduction of the tubes. At the same time, the relatively positive potential formerly applied through rectifier 70 to turn the beam on, is now relatively low, which permits the positive pulse from tube 47 to flip trigger 50 and turn the beam off. Thus, the prescanning operation is completed and the main scanning operation can now commence.

Before describing the main scanning operation it will be explained how the deflection plates are set up during prescanning to assure that the scanning beam starts its scan from the effective center of the digit. It will be remembered that capacitors 43 and 51 were charged to values which were dependent on which side of the character was first intercepted. Capacitor 51 was charged higher than capacitor 43 due to the beam intercepting the bottom of the character first. This had the effect of pulling the focal point of the beam further down towards the middle of the character. After both the top and bottom of the character was intercepted during several spiral sweeps, the medium shifting voltage affecting the beam was the difference of the voltages at capacitors 51 and 43. By applying the potentials on capacitors 43 and 51 to deflection plates 18 and 19, respectively, the focal point of the spiral scan was centered in the character. The capacitor charge is not drained off during main scanning so that the beam maintains the medium shifting voltage as a focal point for the main scan.

Figure 7:
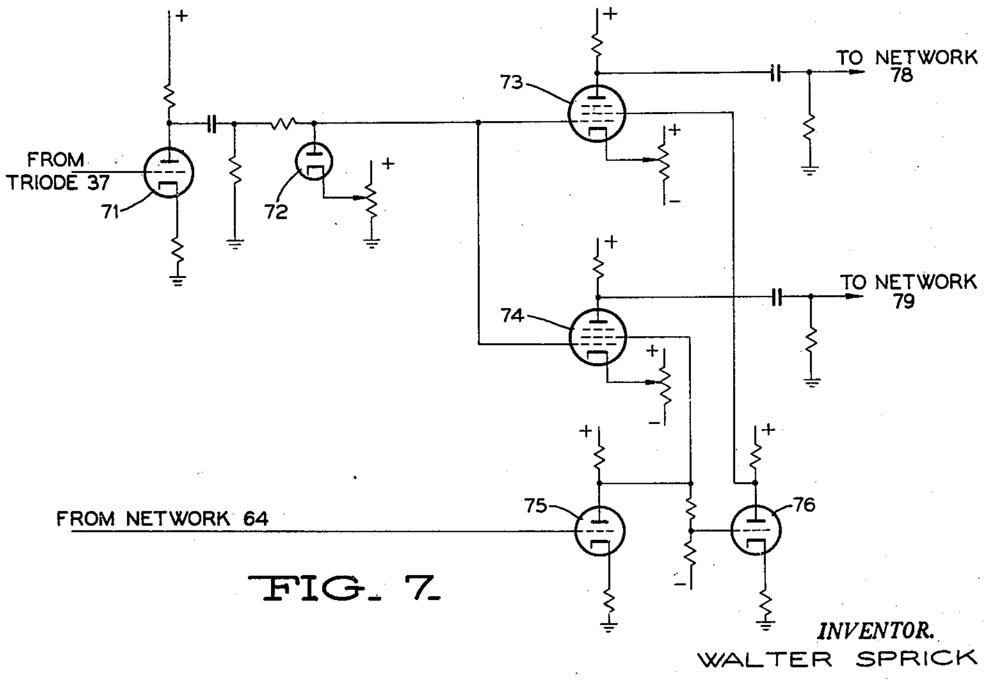
Fig. 7 shows a schematic diagram of a superimposer circuit which provides an output signal, when an image pulse occurs, of a magnitude proportional to the distance of the image point from the approximate center of the character.

When trigger 20c turns "on" a relatively high potential is applied through lines 38 and 39 to the control grid of tube 37, thereby preparing said tube for conduction in the event of an image pulse. A similar potential is applied through lines 38 and 54 to a pulse generator 55 and a sine wave generator 56, and through appropriate resistors to the control grids of tetrodes 57 and 58. Pulse generator 55 may be of a conventional type which produces positive pulses of short duration, spaced in time in accordance with the frequency at which the scanning beam is to radiate from the focal point. These positive pulses are fed to the plate of a diode 63 which conducts upon the occurrence of a pulse and charges RC network 64 producing a sawtooth output. This voltage is applied to the screen grids of tubes 57 and 58 and to superimposer 65. The details of the superimposer are shown in Fig. 7 and will be explained later in the description. Sine wave generator 56 is also conventional and is arranged to supply a voltage on line 59 which is 180° out of phase with that on line 60. The sine wave generator output is phase shifted by RC network 61 so that the potential on line 62 is at 270° when the potential on line 60 is at 0°. The potentials on lines 59 and 62 are fed to the control grids of tetrodes 58 and 57, respectively. The frequency of these sine wave voltages is dependent on the rate at which it is desired to make a scan of 360° on the character.

The potentials on the plates of tubes 57 and 58 are capacitively coupled to deflection plates 16 and 18, respectively. The type of scanning produced by the deflection plates is shown in Fig. 2. The potential on line 62 is capacitively coupled to the control grid of tube 67. Tube 67 begins conducting shortly after the potential begins its rise from its most negative value. Just before the tube turns on a positive potential is applied through rectifier 68 to trigger 50, turning the scanning beam on.

The beam normally rests at the focal point due to the charge on capacitors 43 and 51. The first sweep radiates from the focal point approximately in the 0° direction, as seen in Fig. 2. Just before the sweep begins the control grid potential on tube 58 will be at 180° and that on tube 57 will be at 270°. Without the sawtooth voltage from network 64, the scanning beam would rest at the end of the sweep. With the sawtooth potential applied to tubes 57 and 58, the plate output causes the scanning sweep. The beam starts from the focal point and travels in the 0° direction. The next sweep will be in a direction displaced a few degrees from 0°, this being caused by the changing sine wave potentials from generator 39. During a complete sine wave, i. e., 360°, the character is scanned by the radial sweeps of the beam.

The positive pulses obtained when the scanning beam intercepts a portion of the character are supplied through amplifier 36 to the control grid of a triode 37. The plate output is in the form of negative pulses, these pulses being supplied to superimposer 65. The details of the superimposer are shown in Fig. 7, reference being made thereto for an understanding of the operation thereof.

The negative pulses from the plate of tube 37 are supplied to the control grid of a triode 71, Fig. 7, the output from the tube being in the form of positive pulses. These pulses are clipped to the same amplitude by diode 72 and supplied to the control grids of pentodes 73 and 74.

The sawtooth potential from network 64 is supplied to triode 75, the plate potential being in the form of an inverted sawtooth. This plate potential is supplied to the control grid of triode 76. The plate potential of triode 76 is in the same form as the input to triode 75. The sawtooth potentials from triodes 75 and 76 are supplied to the screen grids of pentodes 74 and 73, respectively. It will be seen that the early occurring pulses in one sawtooth sweep will have the highest amplitude from the plate of pentode 74 and that the later occurring pulses during the same sawtooth sweep will have the higher amplitude at the plate of pentode 73. The negative pulses on the plate of pentodes 73 and 74 are RC coupled to integrating networks 78 and 79, respectively. Each integrating network comprises a diode 80 the plate of which is coupled to the superimposer and the cathode of which has an RC network comprising a resistor 81 and a capacitor 82 connected thereacross. The integrating networks have the effect of developing an envelope potential. Network 78 providing an envelope potential in accordance with the upper portion of the character and network 79 providing an envelope in accordance with the lower portion of the character. For example, referring to Fig. 4 the digits 0–9 are shown at (*a*) and the envelope potentials are shown at (*b*). It will be noted that at approximately 220° in scanning the digit "2" that the scanning beam intercepts a centrally located portion of the digit and also the extreme lower right portion thereof. It is this extreme lower right portion which provides the rise in the envelope potential at that point. Thus, it will be seen that during a certain portion of the sweep upper and lower envelopes are provided. The potentials from integrating network 78 and 79 are passed through RC differentiating networks 83 and 84, respectively, thereby producing the pulse arrangement shown at (*c*) in Fig. 4. These characteristic pulses are supplied to pulse discriminators 99 and 100 and then to analyzing circuit 85.

A description will now be made of the manner in which the characteristic pulses occurring in one entire sweep are divided into zones. In the present explanation three zones have been utilized.

Figure 14:
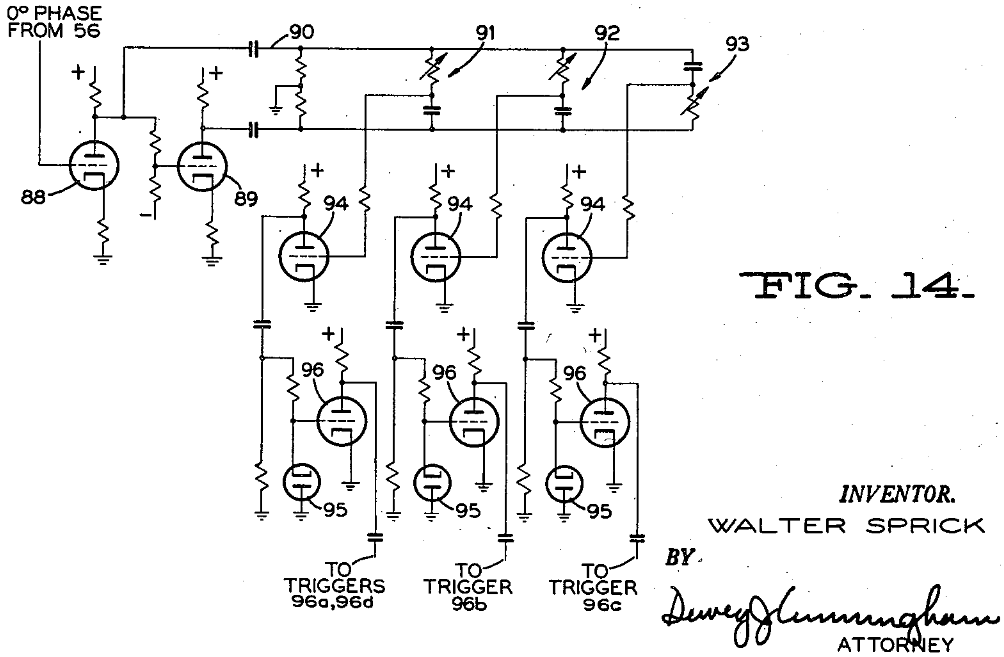
Fig. 14 is a schematic circuit diagram of the phase shifting network utilized to provide zoning pulses.

The 0° reference potential on line 60 is supplied through line 86 and inclination control circuit 190 to a phase shifting network 87, said network being shown in detail in Fig. 14. Referring to Fig. 14, the reference potential is supplied to a triode 88 where it is inverted and supplied to a common line 90, which is connected to one side of RC phase shifting networks 91, 92 and 93 and to a triode 89. The output potential from triode 89 is supplied to the other side of said phase shifting networks. The potential from the midpoint of phase shifting network 91 leads the 0° reference potential by 20° and is supplied to triode 94 where it is inverted and coupled across a clipping diode 95 to the control grid of the triode 96. Diode 95 has the effect of allowing only the positive portion of the sine wave to go through the grid of tube 96. Tube 96 is biased so that shortly after conduction begins grid current starts flowing and limits the amplitude of the sine wave. The plate output from tube 96 is RC coupled to triggers **96*a* and 96*d* of trigger ring 96. The connection to the trigger circuitry is such that only the negative pulses will affect the trigger operation. Trigger 96*a* is normally in the "on" condition. Therefore, when the negative pulse is applied from network 87 to both 96*a* and 96*d* the latter trigger will not be affected, since it is already "off," but trigger 96*a* will be turned "off." The plate of the side of the trigger which is conducting when the trigger is "on" is coupled to the grid of the corresponding side of trigger 96*b*. Thus, when trigger 96*a* is turned "off" by the negative pulse, trigger 96*b*** is turned "on."

The phase of the voltage from the midpoint of RC network 92 is such that after the potential has been passed through appropriate inverting, clipping and limiting tubes such as tubes 94, 95 and 96 a negative pulse will be supplied to a trigger **96*b* to turn the trigger "off," which, after being turned "off," turns trigger 96*c* "on." This pulse occurs 150° after the beginning of the 0° phase reference voltage. Inverting, clipping and limiting tubes such as those for phase shifting networks 91 and 92 are provided for phase shifting network 93, the phase of the voltage from network 93 being such that a trigger 96*c* receives a negative pulse 250° after the beginning of the 0° reference potential. After this has been completed a pulse is provided from network 91 and its associated circuitry 380° following the beginning of the 0° reference potential, or one complete cycle following the initiation of the first pulse from said network. This pulse turns trigger 96***d* "off," which, in being turned "off," turns trigger 96*a* "on." This returns the trigger ring to its normal rest position. The pulse which is supplied from trigger 96*d* to trigger 96*a* is also fed through a rectifier 97 to the beam control trigger 50 which turns the scanning beam off. The positive pulse is also applied to trigger 20*a* which turns "off" trigger 20*c*. When trigger 20*c* turns "off," a relatively low potential is applied to the control grid of triode 37, signal generator 55, sine wave generator 56 and the control grid of tetrodes 57 and 58. When trigger 20*a* turns "on" a relatively low potential is supplied to the cathodes of diodes 26 and 27 which discharges capacitors 43 and 51. A relatively high potential is applied from the last named trigger to diode 22 thus preparing the entire circuitry for another scanning operation.

The pulses from differentiating circuits 83 and 84 are supplied to pulse discriminating circuits 99 and 100, respectively. The function of these circuits is to distinguish between conditions where only single pulses are received at spaced intervals and where one pulse is immediately followed by another. Referring to Fig. 4, there is shown at (*c*) the characteristic pulses obtained from the characters shown at (*a*). The following coding may be applied to these characteristic pulses:

| Digit | Upper Envelope | | | Lower Envelope | | |
|---|---|---|---|---|---|---|
| | Zone 1 | Zone 2 | Zone 3 | Zone 1 | Zone 2 | Zone 3 |
| 0 | 2 | 0 | 0 | 0 | 0 | 0 |
| 1 | 12 | 0 | 2 | 12 | 0 | 2 |
| 2 | 1 | 2 | 2 | 1 | 0 | 2 |
| 3 | 12 | 0 | 1 | 12 | 0 | 1 |
| 4 | 2 | 1 | 2 | 2 | 0 | 2 |
| 5 | 2 | 0 | 1 | 2 | 0 | 1 |
| 6 | 2 | 0 | 0 | 2 | 0 | 0 |
| 7 | 1 | 2 | 2 | 1 | 2 | 2 |
| 8 | 2 | 0 | 2 | 2 | 0 | 2 |
| 9 | 1 | 0 | 2 | 1 | 0 | 2 |

The symbol 0 means that no characteristic pulse occurs in that zone. The symbol 1 means that only a single pulse occurs in the zone. The symbol 2 indicates that a double pulse, i. e., one immediately following another, occurs in a zone. The symbol 12 indicates that a single pulse and also a double pulse are obtained in a zone.

Figure 9:
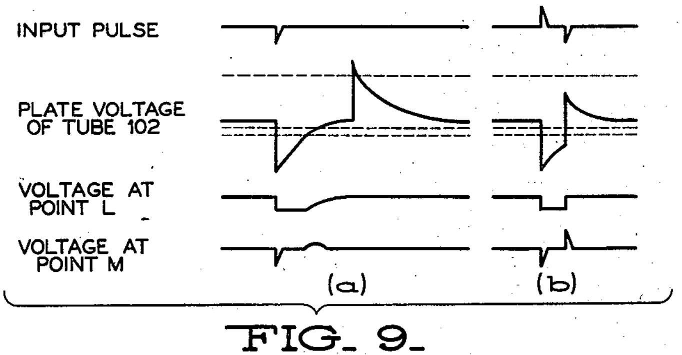
Fig. 9 shows at (*a*) the potentials at various points in the circuit of Fig. 8 when a single pulse occurs, and at (*b*) the potentials at similar points in the circuit of Fig. 8 when two pulses occur in rapid succession.
Figures 8, 11:
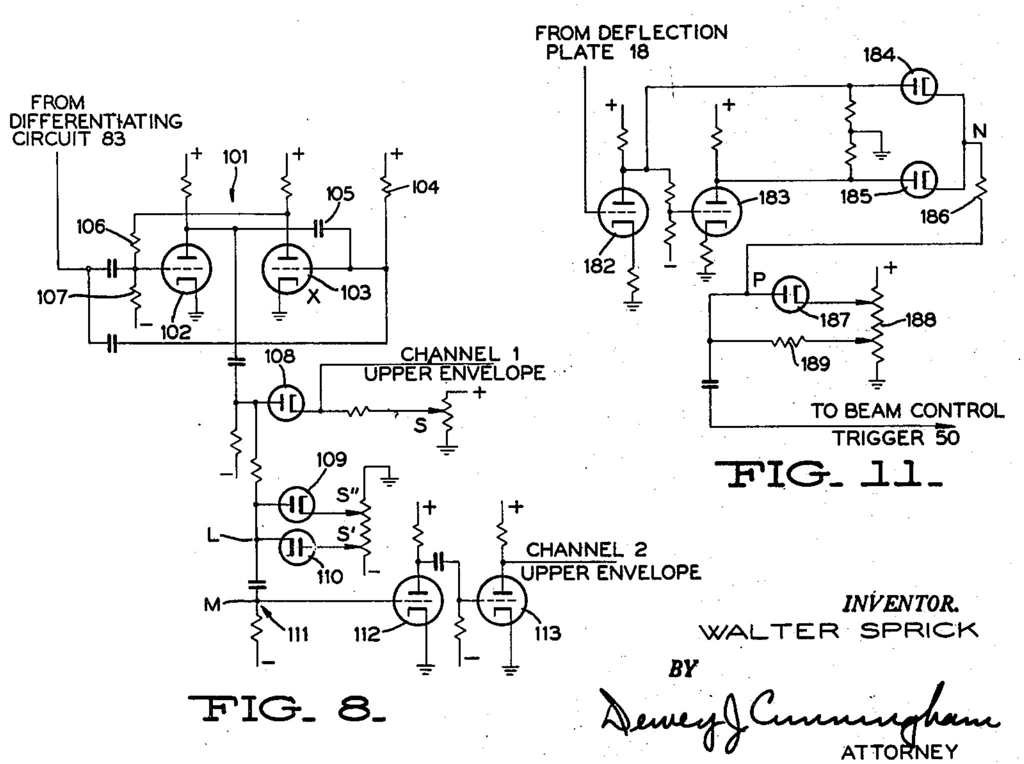
Fig. 8 is a schematic diagram of a pulse discriminator circuit.
Fig. 11 shows a schematic diagram of a circuit for providing dark-control of the scanning beam.

Circuits 99 and 100 are identical and for this reason only circuit 99 will be shown and described in detail. Referring to Fig. 8, circuit 99 is shown to comprise a monostable multivibrator 101 which contains a left triode 102 and a right triode 103. The input pulses from RC network 83 are applied through appropriate capacitors to the control grids of both tubes. The symbol X denotes that the right tube 103 is normally conducting during the stable state of the multivibrator. The plates of both tubes are connected through appropriate resistors to a positive potential. The grid of tube 103 is connected through a resistor 104 to a positive source of potential and through a capacitor 105 to the plate of tube 102. The plate of tube 103 is connected through a resistor 106 to the grid of tube 102, the last named grid being connected to a negative potential through a resistor 107. Referring to Fig. 9, at (*a*) a single input pulse is shown. While a negative pulse is shown by way of example, it could be either positive or negative. This single pulse flips the multivibrator to an unstable state with tube 102 conducting temporarily and tube 103 off. The plate voltage of tube 102 drops sharply but gradually rises due to the fact that it is not placed into a fully conducting state. The potential soon rises to a point where tube 103 begins conducting which cuts off tube 102. Due to capacitor 105 the plate voltage of tube 102 peaks rapidly and then falls off.

In Fig. 9 at (*b*), the condition is shown where a first pulse is followed almost immediately by a second pulse. Here again, the pulses may be of any polarity, the positive and negative pulses being shown by way of example. The first pulse causes the same action as before. However, before the multivibrator can restore to its stable state a second pulse occurs which prematurely returns the multivibrator to its stable state. This second pulse occurs shortly after the plate potential of tube 102 begins to rise and immediately raises the potential to a peak potential which then falls off.

By supplying these pulses to the plate of a diode 108, the cathode of which is biased to some predetermined potentials, only the condition where a single pulse occurs will provide an output pulse therefrom. This output is sent out over channel 1, i. e., channel 1 for the upper envelope.

The pulses from the multivibrator are also supplied to the plate of a diode 109 and to the cathode of a diode 110. The cathode of diode 109 is connected to a potential S'' while the plate of diode 110 is connected to a potential S'. These diodes have the effect of clamping the pulses between limits to provide the output at point L as shown in Fig. 8. RC network 111 provides differential pulses at point M. Only the positive pulse can get through tube 112, this pulse being inverted therein and supplied to tube 113. This tube provides a positive pulse from the plate thereof, which is fed to channel 2 for the upper envelope.

It will be seen from the above that if a single pulse, i. e., one not followed immediately by a second pulse, occurs in a zone, a positive pulse will be fed from channel 1. If a double pulse occurs, i. e., one pulse followed directly by a second pulse, a positive pulse will be fed from channel 2.

Figure 10:
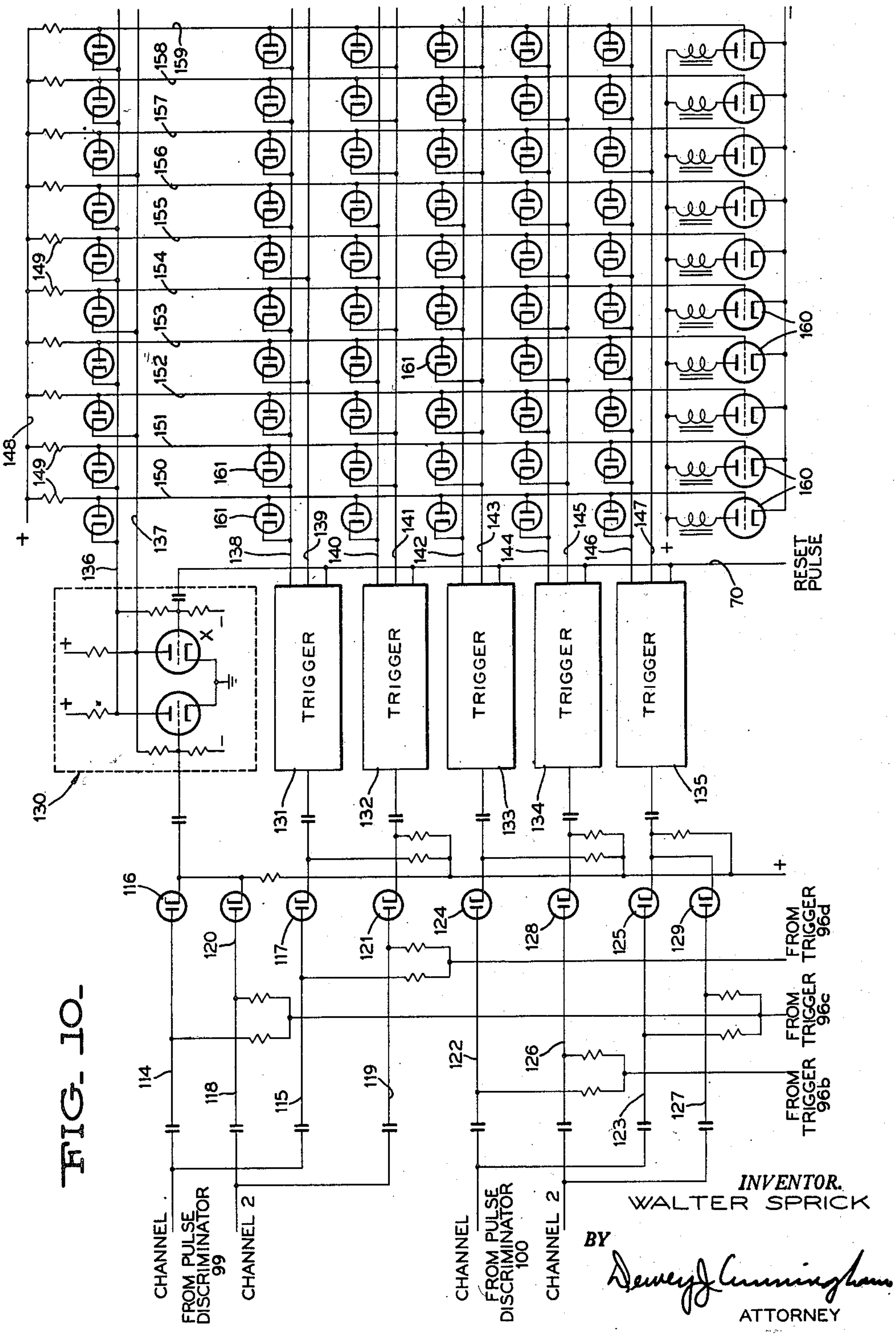
Fig. 10 shows an analyzing circuit for receiving the derivative pulses shown in Fig. 4 at (*c*) and determining therefrom the identification of the character.

The outputs from channels 1 and 2 for pulse discriminators 99 and 100 are supplied to analyzing circuit 85, the details of which are shown in Fig. 10. The output pulses from pulse discriminator 99 on channel 1 are supplied to lines 114 and 115 which connect to the plates of diodes 116 and 117, respectively. The channel 2 pulses from discriminator 99 are supplied to lines 118 and 119 which connect to the plates of diodes 120 and 121, respectively.

The output pulses from pulse discriminator 100 on channel 1 are supplied to lines 122 and 123 which connect to the plates of diodes 124 and 125, respectively. The output pulses on channel 2 of discriminator 100 are fed to lines 126 and 127 which connect to the plates of diodes 128 and 129, respectively. Lines 122 and 126 are raised to a positive potential during the time trigger 96*b* is "on," this potential being supplied from the plate of the side of the trigger which is not conducting in the "on" condition. Similar positive potentials are supplied to lines 123, 127, 114 and 118 from trigger 96*c*, and to lines 115 and 119 from trigger 96*d*.

The cathodes of diodes 116, 117, 120, 121, 124, 125, 128 and 129 are connected to such a level of potential that a particular diode will conduct only upon a coincidence of the relatively high positive potential from one of the triggers and a positive pulse in one of the channels. When one of the diodes conducts a pulse is applied to one of the storage triggers 130, 131, 132, 133, 134 and 135 which is associated therewith. All of these triggers are alike, the details of trigger 130 being shown to be of the bistable flip-flop type, the symbol X denoting the side of the trigger which conducts when the trigger is "off."

The output potentials from the triggers are taken from the plates of the left and right sides thereof and fed to a diode matrix. Output lines 136 and 137 are associated with the plates of the left and right tubes, respectively, of trigger 130. Lines 138 and 139, 140 and 141, 142 and 143, 144 and 145, and 146 and 147 are associated with triggers 131, 132, 133, 134 and 135, respectively, in a similar manner. By way of example, it will be seen that when a pulse fails to occur on line 114 during zone 2, trigger 130 remains in the "off" condition. Therefore, lines 136 and 137 are relatively high and low, respectively. When a pulse does occur on line 114 during zone 2, trigger 130 is turned "on" and the relative potentials on lines 136 and 137 are reversed, i. e., line 136 is low and line 137 is high.

A relatively high potential on line 148 is applied through resistors 149 to lines 150, 151, 152, 153, 154, 155, 156, 157, 158 and 159. Each of the above lines is connected to an appropriate utilizing device such as thyratrons 160. It will be understood that other types of devices could be used, depending upon the operation which is desired.

Trigger output lines 136, 137, 138, 139, 140, 141, 142, 143, 144, 145, 146 and 147 are connected to certain ones of lines 150, 151, 152, 153, 154, 155, 156, 157, 158 and 159 by diodes 161, the cathodes of the diodes being associated with the first mentioned group of lines and the plates being connected to the second mentioned group of lines. The diodes are arranged in a pattern in accordance with the code previously described. It will be understood that any trigger output line which is relatively low will permit the diodes associated therewith to conduct, thereby dropping the plate potential of the diodes which do conduct. This pulls the lines down to the relatively low potential which are associated with the conducting diodes.

It will be seen from Fig. 10 and the coding arrangement previously described that the pulses obtained in zone 1 for the upper envelope and in zone 3 for the lower envelope are not utilized in determining the identification of a character. An unambiguous coding for the digits 0–9 is provided with the remaining zones in the upper and lower envelopes. It is apparent that the pulses left out in the present instance could be utilized where more complex characters are to be identified such as letters. The principle of the present invention applies equally to letters, it being only necessary to rearrange the circuitry shown in Fig. 10. It is also possible to divide the scanning into additional zones, i. e., using four zones instead of three. All these rearrangements would be within the skill of a person familiar with this art.

A sample identification will be described. The coding arrangement for the digit "3" results in no pulse in channel 1 of the upper envelope during zone 2, a pulse in channel 1 of the upper envelope during zone 3, a pulse in both channels 1 and 2 of the lower envelope during zone 1, and no pulse in the upper envelope during zone 2. These pulses cause triggers 131, 133 and 134 to be turned "on." When this occurs the output lines from triggers 130, 132 and 135 are unchanged, i. e., lines 136, 140 and 146 are relatively high and lines 137, 141 and 147 are relatively low. Output lines 138, 142 and 144 are relatively low and output lines 139, 143 and 145 are relatively high. Under these conditions at least one of the diodes associated with lines 150, 151, 152, 154, 155, 156, 157, 158 and 159 will conduct causing all of these lines to drop to a relatively low potential, preventing the thyratrons associated therewith from being fired. However, none of the diodes associated with line 153 will conduct, thus allowing the relatively high potential from line 148 to pass therethrough to fire the thyratron associated with line 153. This identifies the character as the digit "3." A reset pulse over line 70 is furnished to all the triggers to turn them "off."

Figure 13:
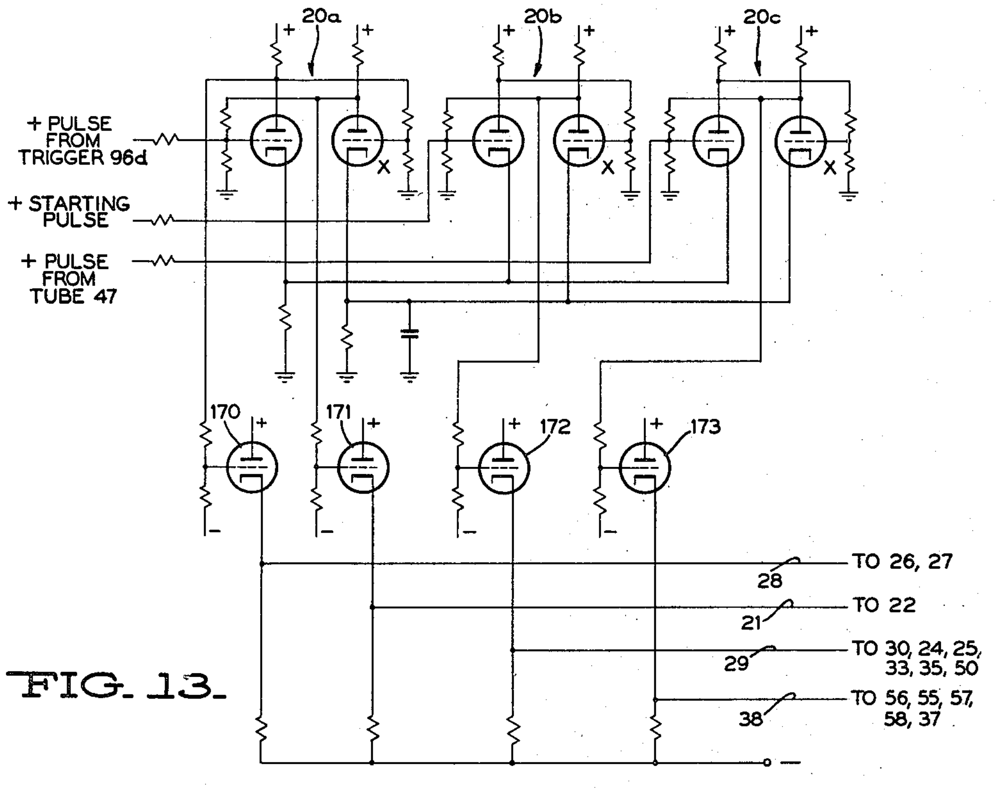
Fig. 13 is a schematic diagram of the scanning control trigger ring.

As previously mentioned, the details of the trigger ring 20 are shown in Fig. 13. All the triggers are of the bistable flip-flop type comprising a left side and a right side, the right side being denoted by an X which indicates that when this side is conducting the trigger is considered to be "off." It should be mentioned that in this ring only one of the triggers will be "on" at any time. However, at any instant, one of the triggers will be "on." The symbol X is used only for the purpose of indicating the "off" condition of the trigger. Trigger 20*a* is "on" during the rest position so that the left side thereof is conducting. The plate of the left side is relatively low in potential and is connected to the control grid of a triode 170, said triode being connected as a cathode follower to provide a relatively low potential on line 28 which is supplied to diodes 26 and 27. The plate potential of the right side of trigger 20*a* is relatively high in potential and connects to the control grid of a triode 171 which is connected as a cathode follower. Therefore a relatively high potential is supplied over line 21 to diode 22.

A positive starting pulse is applied to the grid of the left side of trigger 20*b*, turning the trigger "on." At the same time, trigger 20*a* turns "off," which reverses the potentials on lines 28 and 21. The plate of the right side of trigger 20*b* is relatively high when the trigger is "on," this plate being connected to the control grid of triode 172, said tube being connected as a cathode follower. Therefore, the potential on line 29 is relatively high at this time, this output being connected to sine wave generator 30, the control grids of tubes 24, 25, 33, 35, and trigger 50.

When the positive pulse from tube 47 is supplied to the grid of the left side of trigger 20*c*, this trigger is turned "on" and trigger 20*b* turns "off." The turning "off" of trigger 20*b* causes the potential on line 29 to drop. When trigger 20*c* is "on," a relatively high potential is supplied from the plate of the right side thereof to the control grid of triode 173. This triode is also connected as a cathode follower so that the potential on line 38 rises, this potential being supplied to sine wave generator 56, signal generator 55 and the control grids of tubes 57, 58 and 37.

When trigger 96*d* is turned "off" a positive pulse is supplied to trigger 20*a* to turn the trigger "on," thus turning "off" trigger 20*c* and dropping the potential on line 38.

In order to prevent the scanning operation which covers one character from receiving pulses from adjacent characters within the scanning field, the circuitry shown in Fig. 11 may be utilized. It will be seen from Fig. 6 that the inputs to deflection plates 16 and 18 are picked off and supplied to dark-control circuits 181 and 180, respectively, the outputs of the last named circuits being supplied to one side of trigger 50. Since both dark-control circuits are identical only circuit 180 will be described in detail.

Referring to Fig. 11, the potential applied to deflection plate 18 is tapped and supplied to a triode 182 which inverts the phase of the applied potential. The tube output is fed to the plate of a diode 184 and to the control grid of a triode 183. The output from triode 183 is of the same phase as the input to tube 182 and is applied to the plate of a diode 185. The plates of the diodes are connected through appropriate resistors to a common ground. The cathodes of the diodes are connected to a common point and fed across a resistor 186 to the plate of a diode 187, the cathode of said diode being connected to some predetermined level on a resistor 188. A resistor 189 is connected to the plate of diode 187 and to a lower point on resistor 188. The output potential is picked off the plate of diode 187 and capacitively coupled to the beam control trigger 50.

Figure 12:
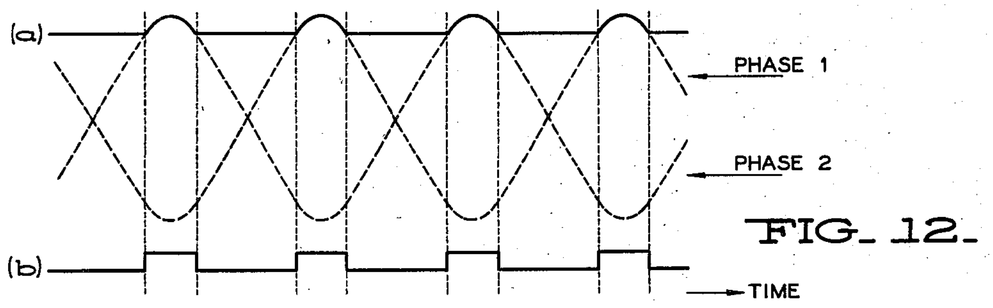
Fig. 12 shows at (*a*) and (*b*) the voltage potentials obtained at points N and P, respectively, in Fig. 11.

Fig. 12, at (*a*) indicates the phase 1 and phase 2 potentials, the positive peaks of which are allowed to pass through diodes 184 and 185 to point N on Fig. 11. At point P on Fig. 11 the potentials shown at (*b*) in Fig. 12 exist. These potentials are capacitively coupled to the beam control trigger 50, the input pulses to the trigger being first a positive pulse to turn the beam off and then a negative pulse to turn the beam on. Thus, an area to the top and bottom of the character is darkened. Dark-control circuit 181 is arranged to provide an area to the left and right of the character which is darkened.

The above circuit not only provides protection from scanning more than one character at once but in addition prevents possible spurious signals which may be obtained due to dark specks or other defects in the paper which may be in the scanning area but outside the rectangle provided.

Figure 5:
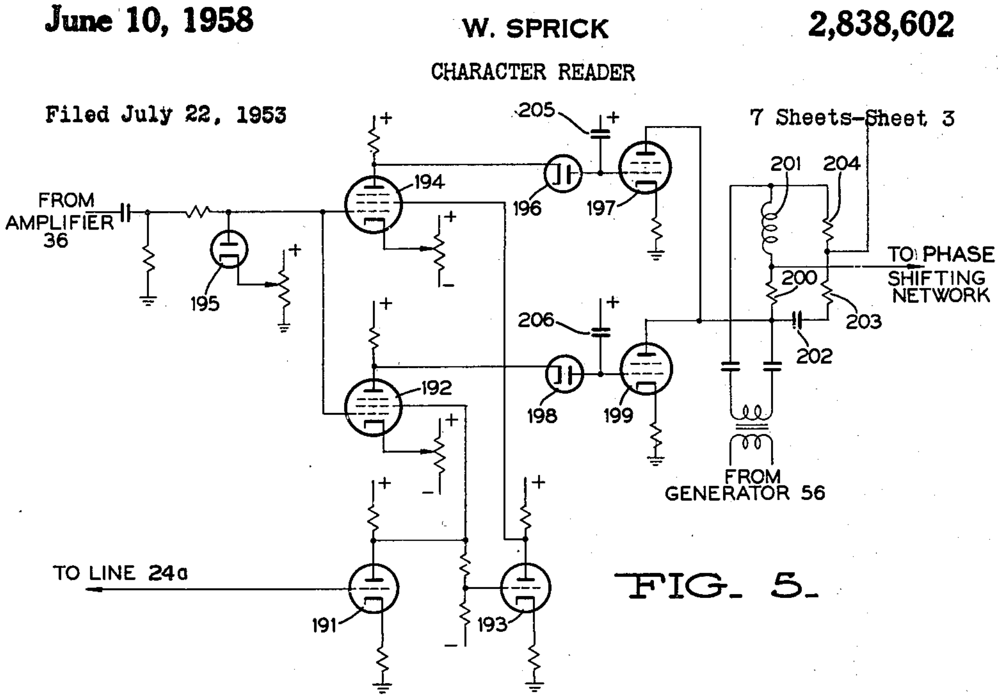
Fig. 5 shows schematically a circuit for shifting the phase of the zoning control potential an amount proportional to the inclination of a character to the vertical.

It is also necessary to provide for various degrees of inclination of handwriting which varies with different persons. Referring to Fig. 5, the inclination control circuit 190 is shown in detail. It will be seen that the horizontal deflection voltage passes through the zero reference line when the scanning beam is at 90° and at 270°, which corresponds to the time when the scanning beam is at the top or bottom of the character. Therefore, if a picture pulse is obtained at this time during the prescanning operation, the coincidence of a zero potential and a picture pulse indicates that the inclination of the writing is vertical. If the inclination moves counterclockwise or clockwise, the latter being the most usual case, the horizontal deflection voltage will be at some value other than zero. The potential which exists at the time a picture pulse is obtained at the top or bottom of the character may be used to shift the phase of the input potential supplied to phase shifting network 87. Referring to Fig. 5, the horizontal deflection voltage on line 24*a* is fed to the control grid of a triode 191, the plate output of which is supplied to the screen grid of a pentode 192 and the control grid of a triode 193. The plate output from the latter triode is fed to the screen grid of a pentode 194. It will be apparent that the screen grids of tubes 192 and 194 are supplied with sine wave potentials which are 180° out of phase. The positive picture pulses from amplifier 36 are coupled to the control grids of tubes 192 and 194. The control grids are connected to the plate of a diode 195, the cathode of which is connected to an appropriate source of potential. This diode clips all of the picture pulses to a desired amplitude.

With the arrangement aforementioned, an image pulse obtained during the prescanning operation by intercepting the top portion of a character which is inclined so that the beam is past the 90° point when interception occurs, causes tube 194 to conduct, providing a negative pulse at the plate thereof. This pulse is applied to the cathode of a diode 196, the plate of which is connected to the control grid of a tetrode 197. When the bottom of the same character is intercepted tube 192 conducts, sending a negative pulse to the cathode of a diode 198, the plate of said diode being connected to the control grid of a tetrode 199. The plates of tetrodes 197 and 199 are connected to a common point on a bridge circuit having a resistor 200 and an inductance 201 in one branch thereof and a capacitor 202 and resistors 203 and 204 in the other branch thereof. The point in said bridge circuit opposite the common plate connection is connected to a source of positive potential. The zero degree reference potential from line 60 is applied across inductance 201 and resistor 200.

The operation of the circuit is such that the potentials passing through diodes 196 and 198 are stored for use in the main scanning operation on capacitors 205 and 206, respectively, which are connected across the diode output. This stored potential causes the plates of tubes 197 and 199 to rise in potential an amount proportional to the charge on the capacitors. Since the plates are connected together the potential thereon will be proportional to the mean value of the charge on the capacitors. The rise in plate potential causes the average current flow through inductance 201 to change which shifts the phase of the sine wave potential applied from generator 56 during the main scanning operation. The shift in phase, as picked off between inductance 201 and resistor 200, is proportional to the amount of inclination from the vertical of the character being scanned.

From the above detailed description it will be seen that I have provided an apparatus for reading and identifying characters which are either printed or handwritten. The apparatus is provided with means whereby the inclination of the characters, as well as the vertical position thereof in the scanning field, is automatically compensated. The size of the character to be read may vary considerably without affecting the ability of the device to identify the character. Dark-control circuitry is also provided which effectively permits pulses to be obtained only within a predetermined area surrounding the character, thus preventing the possibility of reading two characters or portions thereof at one time.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an analyzing device for reading characters, a scanning station, scanning means adapted to scan a field at said station which includes a character, scanning control means connected to said scanning means for causing said scanning means to traverse an ever-decreasing spiral path in the scanning field, and means responsive to the sensing of the top or bottom portions of said character for displacing the focal point of said spiral path toward the effective center of said character.

2. In an analyzing device for reading characters, a scanning station comprising scanning means adapted to scan a field which includes a character, scanning control means connected to said station for causing said scanning means to traverse an ever-decreasing spiral path in the scanning field, means responsive to the interception of said scanning means with said top and bottom portions of said character for providing an output signal proportional to the amount of inclination of said character from a predetermined reference line, said scanning means causing a second scanning operation emanating from said effective center in the form of a series of radial sweeps, means for providing output signals when said scanning means intercepts said character, and means for analyzing said output signals to provide a manifestation indicative of the identity of the character scanned.

3. In an analyzing device for reading characters, a scanning station, scanning means adapted to scan a field at said station which includes a character, scanning control means, sensing means for providing output signals when said scanning means scans portions of said character, means connecting said sensing means to said scanning control means, said scanning means being governed by said scanning control means to perform a first scanning operation for locating the effective center of said character, said scanning control means being responsive to the location of said effective center for causing a second scanning operation emanating from said effective center in the form of a series of radial sweeps, and means connected to said sensing means to receive said ouput signals to provide a manifestation indicative of the identity of the characters scanned.

4. In an analyzing device for reading characters, a scanning station including scanning means adapted to scan a field which includes a character, scanning control means connected to said scanning means to cause said scanning means to traverse an ever-decreasing spiral path in the scanning field, sensing means responsive to the scanning of the top or bottom portions of said character for displacing the focal point of said spiral path toward the effective center of said character, the parts being arranged so that when the sensing means senses both the top and bottom portions of said character the focal point of said spiral path will be at the effective center of the character.

5. In an analyzing device for reading characters, a scanning station, scanning means adapted to scan a field at said station which includes a character, said character being displaced vertically from the center of the field, scanning control means, said scanning control means being connected to cause said scanning means to scan an ever-decreasing spiral path with its focal point at the approximate center of the scanning field, sensing means responsive to the scanning of the top or bottom portions of said character by said scanning means for displacing the focal point of said spiral path toward the effective center of said character, the arrangement being such that when the scanning means senses both the top and bottom portions of said character the focal point of said spiral path will be at the effective center of the character.

6. In an analyzing device for reading characters, a scanning station, scanning means adapted to scan a field at said station which includes a character, scanning control means causing said scanning means to traverse an ever-decreasing spiral path in the scanning field, blanking means connected to receive signals from said scanning control means for setting up a predetermined area surrounding said character so that the scanning means is blanked except when it is scanning within said area, sensing means responsive to the scanning of the top or bottom portions of said character by said scanning means for displacing the focal point of said spiral path toward the effective center of said character, the arrangement being such that when the scanning means intercepts both the top and bottom portions of said character the focal point of said spiral path will be at the effective center of the character.

7. In an analyzing device for reading characters, a scanning station, scanning means adapted to scan a field at said station which includes a character, scanning control means causing said scanning means to traverse an ever-decreasing spiral path in the scanning field, sensing means responsive to the scanning of the top or bottom portions of said character by said scanning means for displacing the focal point of said spiral path toward the effective center of said character, the arrangement being such that when the sensing means senses both the top and bottom portions of said character the focal point of said spiral path will be at the effective center of the character, and means responsive to the sensing of said top and bottom portions of said character by said sensing means for providing an output signal proportional to the degree of inclination of said character from a predetermined reference line.

8. In an analyzing device for reading characters, a scanning station, scanning means adapted to scan a field at said station which includes a character, scanning control means connected to cause said scanning means to traverse an ever-decreasing spiral path in the scanning field, sensing means responsive to the scanning by said scanning means of the top or bottom portions of said character for displacing the focal point of said spiral path toward the effective center of said character, the arrangement being such that when the sensing means senses both the top and bottom portions of said character the focal point of said spiral path will be at the effective center of the character, said scanning control means causing a second scanning operation emanating from said effective center in the form of a series of radial sweeps means for providing output signals when said sensing means senses portions of said character, and means for analyzing said output signals to provide a manifestation indicative of the identity of the character scanned.

9. In an analyzing device for reading characters, a scanning station, scanning means adapted to scan a field at said station which includes a character, said character being displaced vertically from the center of the field, scanning control means, said scanning control means causing said scanning means to begin traversing an ever-decreasing spiral path with its focal point at the approximate center of the scanning field, sensing means responsive to the scanning of the top or bottom portions of said character by said scanning means for displacing the focal point of said spiral path toward the effective center of said character, the arrangement being such that when the sensing means senses both the top and bottom portions of said character the focal point of said spiral path will be at the effective center of the character, said scanning control means causing a second scanning operation in response to the sensing of said top and bottom portions emanating from said effective center in the form of a series of radial sweeps, means for providing output signals when said sensing means senses portions of said character, and analyzing means connected to receive said output signals to provide a manifestation indicative of the identity of the character scanned.

10. In an analyzing device for reading characters, a scanning station, scanning means adapted to scan a field at said station which includes said character, scanning control means connected to said scanning means for causing said scanning means to traverse an ever-decreasing spiral path in the scanning field, blanking means controlled by said scanning control means for setting up a predetermined area surrounding said character so that the scanning means is blanked except when it is within said area, sensing means responsive to the scanning of the top or bottom portions of said character by said scanning means for displacing the focal point of said spiral path toward the effective center of said character, the arrangement being such that when the sensing means senses both the top and bottom portions of said character the focal point of said spiral path will be at the effective center of the character, said scanning control means causing a second scanning operation emanating from said effective center in the form of a series of radial sweeps, means for providing output signals when said sensing means senses portions of said character, and means for analyzing said output signals to provide a manifestation indicative of the identity of the character scanned.

11. In an analyzing device for reading characters and providing manifestations identifying said characters, a scanning station comprising scanning means adapted to scan a character in a plurality of sweeps emanating from the approximate center of said character, sensing means for providing output signals when said scanning means scans portions of said character, means responsive to said output signals for providing a voltage waveform characteristic of the shape of said character, means for differentiating said voltage waveform to provide a pulse pattern to be identified therewith, means for separating the pulses in said pattern into a predetermined number of zones, multistorage means, the particular pulses in particular zones being stored in a particular stage, and means for analyzing the condition in said stages to provide a manifestation indicative of the identity of the character scanned.

12. In an analyzing device for reading characters, a scanning station comprising scanning means adapted to scan a character, scanning control means, said scanning control means causing said scanning means to perform a series of radially extending sweeps from the effective center of the character, said sweeps being angularly related to each other, sensing means for providing output signals when said scanning means scans portions of said character, means for providing a voltage waveform characteristic of the output signal pattern, zoning control means for separating said voltage waveform into a plurality of zones, means connected to said zoning control means and said scanning control means for synchronizing said zoning control means with said scanning control means, means for analyzing the portions of said waveform in said zones to provide a manifestation indicative of the identity of the character scanned, and means for controlling the synchronizing means by the inclination of said character with respect to a predetermined reference line.

13. In an analyzing device for reading characters, a scanning station comprising scanning means, scanning control means, said scanning control means being arranged to cause said scanning means to trace a decreasing spiral path in a field which includes said character, sensing means providing output signals when said scanning means scans portions of said characters, first circuit means connected to said sensing means and responsive to the scanning of the top and bottom portions of said character by said scanning means for determining the inclination of said character with respect to a predetermined reference line, second circuit means also connected to said sensing means and responsive to the scanning of the top and bottom portions of said character by said scanning means for locating the focal point of said spiral path at the effective center of said character, means including switching means responsive to repeated sensing of the top and bottom portions of said character for supplying a signal to said scanning control means for initiating a second scanning operation in which the scanning means is caused to perform a series of radially extending sweeps emanating from the effective center of said character, means responsive to the scanning of portions of said character by said scanning means during the second scanning operation for providing a voltage waveform characteristic of the configuration of the character being scanned, zoning control means arranged to divide said voltage waveform into predetermined portions, means for synchronizing said zoning control means with said series of radially extending sweeps, said synchronizing means being controlled by said first circuit means, and means for analyzing the portions of said voltage waveform in said zones for providing a manifestation indicative of the identity of the character scanned.

14. Apparatus as in claim 13 wherein means is provided for setting up a predetermined area which includes said character to blank said scanning means when it is outside said area.

References Cited in the file of this patent

UNITED STATES PATENTS

| | | |
|---|---|---|
| 1,470,696 | Nicolson | Oct. 16, 1923 |
| 2,122,456 | De Forest | July 5, 1938 |
| 2,163,749 | De Forest | June 27, 1939 |
| 2,193,869 | Goldsmith | Mar. 19, 1940 |
| 2,272,842 | Hickock | Feb. 10, 1942 |
| 2,275,017 | McNaney | Mar. 3, 1942 |
| 2,314,920 | Bumstead | Mar. 30, 1943 |
| 2,406,751 | Emerson | Sept. 3, 1946 |
| 2,437,707 | Pierce | Mar. 16, 1948 |
| 2,510,070 | Cowein | June 6, 1950 |
| 2,617,879 | Sziklai | Nov. 11, 1952 |

OTHER REFERENCES

The SCR—584 Radar, "Electronics," November 1945, pp. 104–109 inclusive.